United States Patent [19]
Radloff et al.

[11] 3,816,793
[45] June 11, 1974

[54] LOW FREQUENCY FILTERED POWER SUPPLY

[75] Inventors: Harry John Radloff, Williamsville; George Cleveland Waybright, Oakfield, both of N.Y.

[73] Assignee: GTE Sylvania Incorporated, Seneca Falls, N.Y.

[22] Filed: June 1, 1973

[21] Appl. No.: 366,181

Related U.S. Application Data

[63] Continuation of Ser. No. 226,047, Feb. 14, 1972, abandoned.

[52] U.S. Cl. .................................................. 315/29
[51] Int. Cl. ............................................ H01j 29/70
[58] Field of Search ...... 315/27 TD, 27 GD, 19, 20, 315/28, 29, 22

[56] References Cited

UNITED STATES PATENTS

| | | | |
|---|---|---|---|
| 3,480,825 | 11/1969 | Popovich | 315/22 |
| 3,518,482 | 6/1970 | Wilmarth | 315/19 |
| 3,668,463 | 6/1972 | Smith et al. | 315/27 GD |
| 3,693,043 | 9/1972 | Wedam | 315/29 |

*Primary Examiner*—Richard A. Farley
*Assistant Examiner*—J. M. Potenza
*Attorney, Agent, or Firm*—Norman J. O'Malley; Thomas H. Buffton; Cyril A. Krenzer

[57] ABSTRACT

In a television receiver having a source of signals at a horizontal scan frequency and a cathode ray tube, a power supply means includes a flyback transformer coupled to the signal source, a voltage multiplier means coupling the transformer to the cathode ray tube, and a low frequency filtering means coupling the transformer to circuit ground whereby low frequency filtering is provided for relatively low value of beam current of the cathode ray tube and undesired bending of a scan raster is inhibited.

4 Claims, 2 Drawing Figures

LOW FREQUENCY FILTERED POWER SUPPLY

CROSS REFERENCE TO OTHER APPLICATIONS

This application is a continuation application of Ser. No. 226,047, filed Feb. 14, 1972, now abandoned, in the name of Harry John Radloff, et al. and assigned to the assignee of the present application, recorded Feb. 14, 1972, Reel 2831, Frame 602.

BACKGROUND OF THE INVENTION

The best known form of high voltage power supply for television receivers utilizes a shunt regulator tube whereby the scan system operates under a relatively constant load condition. In other words, compensation for variations in loading is provided by way of the shunting action of a shunt regulator tube.

Following, voltage multiplier high voltage power supply systems came into being wherein the scan system and high voltage output tube operate under varying, rather than constant, load conditions. Normally, the diodes of the voltage multiplier are continually conducting on every retrace pulse from a high voltage flyback transformer. Thus, the voltage multiplier provides a low frequency discharge path so long as a given minimum electron beam current is present.

However, when the beam current of the cathode ray tube decreases below the above-mentioned minimum value, the capacitance of the voltage multiplier and of the cathode ray tube become charged to a peak voltage in an amount sufficient to seriously reduce conduction of the multiplier diodes. Thus, the above-mentioned low frequency discharge path or low frequency filtering is eliminated or at least rendered ineffective whereupon bending of the scanning raster of the cathode ray tube is observable. Moreover, this undesired bending of the scanning raster appears to occur due to the employment of side pin-cushion correction wherein the horizontal scan system is modulated at a vertical rate.

One known technique for inhibiting raster bending includes the employment of a bleeder resistor intermediate the high voltage source and circuit ground. Thus, a minimum load on the voltage multiplier is assured and electron beam current flow is sufficient to prevent undesired low conduction of the diodes of the voltage multiplier whereupon a low frequency filter is always present.

However, bleeder resistors tend to waste considerable power and to undesirably create heat. Moreover, bleeder resistors suitable for use in the high voltage circuitry are relatively expensive and subject to catastrophic failure. Thus, other solutions to the problem appear to be desirable.

OBJECTS AND SUMMARY OF THE INVENTION

An object of the present invention is to provide an enhanced power supply for a television receiver. Another object of the invention is to provide an improved power supply of the voltage multiplier type. Still another object of the invention is to improve the low frequency filtering capabilities of a voltage multiplier type power supply. A further object of the invention is to provide an improved low frequency filter for a voltage multiplier type power supply.

These and other further objects, advantages, and capabilities are achieved in one aspect of the invention by a television receiver power supply having a transformer means coupled to a signal source at horizontal scan frequency and via a voltage multiplier to a cathode ray tube with a low frequency filter means coupling the transformer means to a potential reference level.

PREFERRED EMBODIMENT OF THE INVENTION

Figures 1, 2:
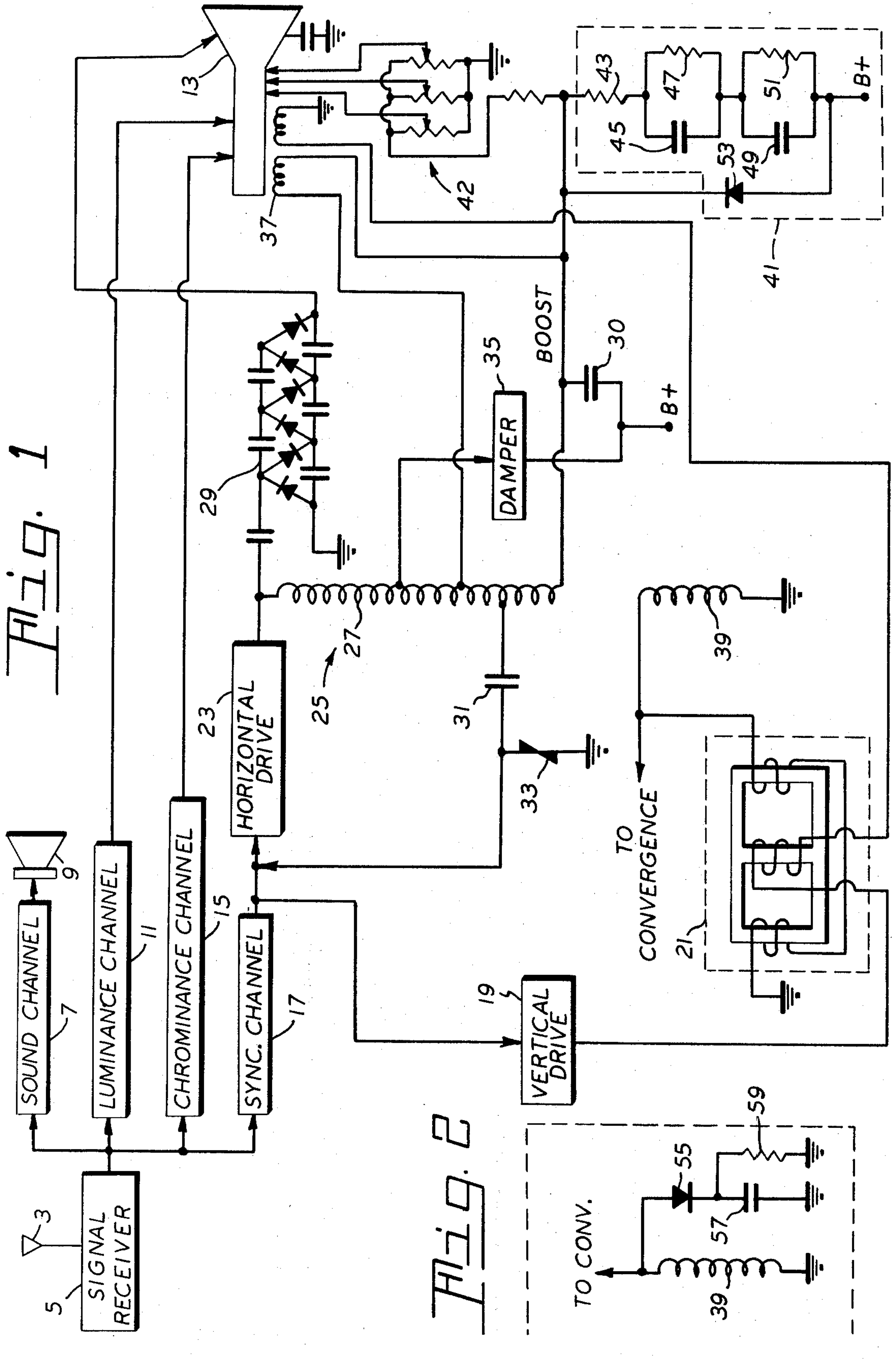
FIG. 1, in block and schematic form, illustrates a voltage multiplier high voltage power supply with low frequency filtering.
FIG. 2 illustrates an alternate embodiment of the low frequency filter of FIG. 1.

For a better understanding of the present invention, together with other and further objects, advantages, and capabilities thereof, reference is made to the following disclosure and appended claims in connection with the above-described drawings.

Referring to FIG. 1 of the drawings, a television receiver includes the usual antenna 3 coupled to a signal receiver 5. The signal receiver 5 provides a composite color signal, in this example, which is applied to a sound channel 7 connected to a loudspeaker 9; a luminance channel 11 coupled to a cathode ray tube means 13; a chrominance channel 15 coupled to the cathode ray tube means 13; and a synchronizing signal separator channel 17.

The synchronizing signal separator channel 17 is coupled to vertical drive circuitry 19 which is, in turn, coupled via pin-cushion correction apparatus 21 to the cathode ray tube means 13 and to a potential reference level such as circuit ground. Also, the synchronizing signal separator channel 17 is coupled to horizontal drive circuitry 23.

The horizontal drive circuitry provides an output signal at a horizontal scan frequency which is applied to a flyback transformer 25. The flyback transformer 25 has a first winding 27 coupled via a voltage multiplier means 29 to the cathode ray tube apparatus 13. The first winding 27 is also coupled by a boost capacitor 30 to a potential source B+ and via a capacitor 31 back to the horizontal drive circuitry 23 with a voltage dependent resistor 33 coupling the capacitor 31 to circuit ground.

Also, a damper means 35 couples the first winding 27 to a supply voltage B+ while a horizontal deflection winding 37 of the cathode ray rube apparatus 13 is shunted across a portion of the first winding 27. Moreover, a second winding 39 of the flyback transformer 25 is coupled to circuit ground with the horizontal portion of the pin-cushion correction apparatus 21 coupled to the winding 39 and to circuit ground.

Further, the first winding 27 of the flyback transformer means 25 is coupled to a low frequency filtering means 41 and to screen electrode controls 42 associated with the cathode ray tube 13. The low frequency filtering means 41, in this embodiment, includes a resistor 43 coupled to the first winding 27, a parallel coupled capacitor 45 and resistor 47 connected to the resistor 43, and a second parallel coupled capacitor 49 and resistor 51 coupling the parallel coupled capacitor 45 and resistor 47 to a potential source. Moreover, a diode 53 shunts the above-mentioned resistor and capacitor circuitry.

As to operation, it can readily be understood that signals from the vertical drive circuitry 19 applied to the pin-cushion correction apparatus 21 would tend to cause modulation of the horizontal scan system which is also coupled to the pin-cushion correction apparatus 21 via the second winding 39 of the flyback transformer means 25. Thus, relatively low frequency, 60 Hz vertical frequency, signals are present in the horizontal scan system.

Also, it can readily be understood that relatively low beam current, under 100 u amp for instance, will tend to cause a potential buildup on the capacitors of the voltage multiplier means 29 since the current flow is insufficient during the trace period of scan to effect significant discharge of these capacitors. Thus, the potential buildup of the capacitors will reduce conduction in the diodes of the voltage multiplier means 29 which further inhibits filtering of the low frequency signals introduced into the flyback transformer means 25 via the pin-cushion correction apparatus 21.

Further, it can also readily be understood that a vertical trace line appearing on a viewing screen of a cathode ray tube in a television receiver would have the usual outward arc referred to as pin-cushion. However, the addition of pin-cushion correction signals tends to alter this outwardly curved arc in a manner such that a relatively straight vertical trace line is achieved under normal operational conditions and with an electron beam current greater than about 100 u amp.

Unfortunately, at relatively low values of electron beam current or low brightness conditions, the low frequency filtering action of the voltage multiplier means 29 and cathode ray tube means 13 is unavailable. Thereupon, the pin-cushion correction potentials tend to overcompensate at the upper and lower extremes of the vertical trace and the scan raster undesirably bends inwardly at the corners. Thus, undesired overcompensation of the pin-cushion problem occurs at low brightness conditions.

Accordingly, low frequency filtering means 41 is affixed to the flyback transformer means 25 and provides low frequency filtering under low brightness conditions. Herein, the resistor 43, parallel coupled capacitor 45 and resistor 47, and parallel coupled capacitor 49 and resistor 51 combine to provide a relatively long time constant low frequency filter. Also, multiple capacitors 45 and 49 are employed, in this example, to reduce component cost while the diode 53 serves to shunt potentials and protect the resistor-capacitor combination in case of failure of the damper means 35.

FIG. 2 illustrates an alternative form of low frequency filter wherein a series connected diode 55 and capacitor 57 shunted by a resistor 59 are coupled intermediate the second winding 39 of the flyback transformer means 25 and circuit ground. The filter operates in a manner substantially as described in that the diode 55 conducts during the scan retrace period to effect charging of the capacitor 57. Thereupon, a slow discharge low frequency filter system is obtained.

Thus, there has been provided a unique low frequency filtered power supply for a television receiver. The system incorporates a pin-cushion correction technique and utilizes voltage multiplier apparatus to achieve the desired high voltage potentials and scan configuration on a cathode ray tube. Moreover, low frequency filtering is provided for relatively low brightness scenes as well as those of normal brightness without undesired distortion of the viewed scan raster.

While there has been shown and described what is at present considered the preferred embodiments of the invention, it will be obvious to those skilled in the art that various changes and modifications may be made therein without departing from the invention as defined by the appended claims.

What is claimed is:

1. In a television receiver having a cathode ray tube and horizontal and vertical signal sources, a low frequency filtered power supply comprising:
- a potential source;
- flyback transformer means coupled to said horizontal signal source;
- voltage multiplier means coupling said transformer means to said cathode ray tube;
- boost capacitor means coupling said flyback transformer means to said potential source; said capacitor and transformer means having a junction forming a boost voltage tap; and
- low frequency filtering means including a parallel connected capacitor and resistor coupling said boost voltage tap of said flyback transformer means to said potential source.

2. The low frequency filtered power supply of claim 1 including a diode shunting said parallel connected capacitor and resistor.

3. In a television receiver having a cathode ray tube means, and a source of signals at horizontal scan frequency, and a source of signals at a vertical scan frequency, a low frequency filtered power supply comprising:
- flyback transformer means coupled to said source of signals at a horizontal scan frequency and having a separate winding providing a pulse signal and a boost voltage tap;
- voltage multiplier means coupling said flyback transformer means to said cathode ray tube means;
- pin-cushion correction means coupling said separate winding of said flyback transformer means to a potential reference level and said source of signals at vertical scan frequency to said cathode ray tube means; and
- low frequency filtering means in the form of a series connected diode and capacitor with the capacitor shunted by a resistor coupling said separate winding to a potential reference level.

4. In a television receiver having a cathode ray tube means, a source of signals at horizontal scan frequency, and a source of signals at vertical scan frequency, a low frequency filtered power supply comprising:
- flyback transformer means coupled to said source of signals at a horizontal scan frequency and having a separate winding providing a pulse signal and a boost voltage tap;
- voltage multiplier means coupling said flyback transformer means to said cathode ray tube means;
- pin-cushion means coupling said separate winding of said flyback transformer means to a potential reference level and said source of signals at vertical scan frequency to said cathode ray tube means; and
- low frequency filtering means in the form of a parallel connected capacitor and resistor coupling said boost voltage tap to a potential reference level.

* * * * *

PO-1050
(5/69)

UNITED STATES PATENT OFFICE
CERTIFICATE OF CORRECTION

Patent No. 3,816,793 Dated June 11, 1974

Inventor(s) Harry John Radloff and George Cleveland Waybright

It is certified that error appears in the above-identified patent and that said Letters Patent are hereby corrected as shown below:

Column 2, line 34 - after "circuitry" insert -- 23 --

Column 2, line 47 - delete "rube" and insert -- tube --

Column 4, line 57 (Claim 4) - after "pin-cushion" insert -- correction --

Column 4, line 28 (Claim 3) - after "means," delete -- and --

Signed and sealed this 1st day of October 1974.

(SEAL)
Attest:

McCOY M. GIBSON JR.
Attesting Officer

C. MARSHALL DANN
Commissioner of Patents